(12) United States Patent
Amine et al.

(10) Patent No.: US 9,005,816 B2
(45) Date of Patent: Apr. 14, 2015

(54) COATING OF POROUS CARBON FOR USE IN LITHIUM AIR BATTERIES

(71) Applicant: UChicago Argonne LLC, Argonne, IL (US)

(72) Inventors: Khalil Amine, Oak Brook, IL (US); Jun Lu, Bolingbrook, IL (US); Peng Du, Woodbridge, IL (US); Yu Lei, Chicago, IL (US); Jeffrey W. Elam, Elmhurst, IL (US)

(73) Assignee: UChicago Argonne, LLC, Chicago, IL (US)

( * ) Notice: Subject to any disclaimer, the term of this patent is extended or adjusted under 35 U.S.C. 154(b) by 56 days.

(21) Appl. No.: 13/786,835

(22) Filed: Mar. 6, 2013

(65) Prior Publication Data

US 2014/0255798 A1  Sep. 11, 2014

(51) Int. Cl.
*H01M 4/13* (2010.01)
*H01M 12/08* (2006.01)
*H01M 8/00* (2006.01)

(52) U.S. Cl.
CPC ............. *H01M 12/08* (2013.01); *H01M 8/00* (2013.01)

(58) Field of Classification Search
CPC . H01M 4/96; H01M 2001/8689; H01M 4/90; H01M 4/86; H01M 4/62; H01M 2300/0094
USPC .............. 429/405, 231.8, 231.7, 231.95
See application file for complete search history.

(56) References Cited

U.S. PATENT DOCUMENTS

2012/0198769 A1* 8/2012 Schirrmeister et al. .......... 48/128
2013/0137001 A1* 5/2013 Zhang et al. .................. 429/405

OTHER PUBLICATIONS

Abraham, K.M. et al., "A Polymer Electrolyte-Based Rechargeable Lithium/Oxygen Battery," Journal of Electrochemical Society, vol. 143, No. 1, 1996, pp. 1-5.
Andrei, P., et al., "Some Possible Approaches for Improving the Energy Density of Li-Air Batteries," J. Electrochem. Soc., 2010, 157(12), A1287-A1295.
Bruce, P. G., et al., "Lithium-air and lithium-sulfur batteries," MRS Bull, 2011, 36(7), 506-512.
Chen, P., et al., "Atomic Layer Deposition to Fine-Tune the Surface Properties and Diameters of Fabricated Nanopores," Nano Letters, 2004, 4(7), 1333-1337.
Christensen, S. T., et al., "Controlled growth of platinum nanoparticles on strontium titanate nanocubes by atomic layer deposition," Small, 2009, 5(6), 750-7.
Chung, Ku-Bong, et al., "Preparation of Analyses of MnO2/Carbon Composites for Rechargeable Lithium-Air Battery," Rev. Adv. Mater. Sci., 2011, 28, 54-58.
Debart, A. et al., "A-MnO2 Nanowires: A Catalyst for the O2 Electrode in Rechargeable Lithium Batteries," Angew. Chem. Int. Ed., 2008, 47(24), 4521-4524.
Elam, J.W. et al., "Viscous flow reactor with quartz crystal microbalance for thin film growth by atomic layer deposition," Rev. Sci. Instrum., 2002, 73(8), 2981-2987.

(Continued)

*Primary Examiner* — Jane Rhee
(74) *Attorney, Agent, or Firm* — Foley & Lardner LLP

(57) ABSTRACT

A cathode includes a carbon material having a surface, the surface having a first thin layer of an inert material and a first catalyst overlaying the first thin layer, the first catalyst including metal or metal oxide nanoparticles, wherein the cathode is configured for use as the cathode of a lithium-air battery.

20 Claims, 11 Drawing Sheets

(56) References Cited

OTHER PUBLICATIONS

Elam, J. W., Routkevitch, D., Mardilovich, P. P. and George, S. M., Conformal Coating on Ultrahigh-Aspect-Ratio Nanopores of Anodic Alumina by Atomic Layer Deposition. Chem. Mater, 2003, 15(18), 3507-3517.

Elam, J.W., et al., "Atomic layer deposition of Palladium films on Al2O3 surfaces," Thin Solid Films, 2006, 515, 1664-73.

Eswaran, M., et al., "High Capacity Li—O2 Cell and Electrochemical Impedance Spectroscopy Study," Electrochem. Solid-State Lett., 2010, 13(9), A121-A124.

Feng, H., et al., "Palladium catalysts synthesized by atomic layer deposition for methanol decomposition," Chem. Mater, 2010, 22(10), 3133-3142.

Feng, H., et al., "Sub-nanometer Palladium Clusters Synthesized by Atomic Layer Deposition," ACS Catal., 2011, 1(6), 665-673.

Figueroa, S. J. A. et al., "Thermal Evolution of Pt-Rich FePt/Fe3O4 Heterodimers Studied Using X-Ray Absorption Near Edge Spectroscopy," Phys. Chem. C., 2011, 115(13), 5500-5508.

Freunberger et al., "Reactions in the Rechargeable Lithium—O2 Battery with Alkyl Carbonate Electrolytes", Journal of the American Chemical Society, 2011, 133(20), pp. 8040-8047.

Freunberger, et al., "The Lithium-Oxygen Battery with Ether-based Electrolytes," Angew. Chem. Int. Ed. 50, 8609-8613, (2011).

Girishkumar, et al., "Lithium-Air Battery: Promise and Challenges," J. Phys. Chem. Lett. 1, 2193-2203, (2010).

Herrera, J. E., et al., "Synthesis, characterization, and catalytic function of novel highly dispersed tungsten oxide catalysts on mesoporous silica," J. Catal., 2006, 239(1), 200-211.

Hummelshoj, et al., "Communications: Elementary oxygen electrode reactions in the aprotic Li-air battery," J. Chem. Phys., 132, 071101, (2011), 5 pages.

Jiang, X. R., et al., "Application of Atomic Layer Deposition of Platinum to Solid Oxide Fuel Cells," Chem. Mater, 2008, 20(12), 3897-3905.

Jiao et al., Mesoporous Crystalline beta-MnO2-a Reversible Positive Electrode for rechargeable Lithium Batteries, Advanced Materials, 19:657-660 (2007).

Chen, Jingzhe, et al., "The Role of Transition Metal Interfaces on the Electronic Transport in Lithium-Air Batteries," Catalysis Today, 2011, 165(1), 2-9.

Keranen, J., et al., "Preparation, characterization and activity testing of vanadia catalysts deposited onto silica and alumina supports by atomic layer deposition," Appl. Catal., 2002, 228(1), 213-225.

Kuboki et al., "Lithium-air batteries using hydrophobic room temperature ionic liquid electrolyte", Journal of Power Sources, Elsevier SA, CH, vol. 146, No. 1-2, Aug. 26, 2005, pp. 766-769.

Laoire, Co., et al., "Elucidating the mechanism of oxygen reduction for lithium-air battery applications," The Journal of Physical Chemistry, 2009, C 113 (46), 20127-20134.

Laoire, et al., "Rechargeable Lithium/TEGDME-LiPF6/O2 Battery," Journal of the Electrochemical Society, 158, (3), A302-A308, (2011).

Lei, Y. et al., "Increased silver activity for direct propylene epoxidation via subnanometer size effects," Science, 2010, 328(5975), 224-8.

Leskela, M; Ritala, M., "Atomic layer deposition (ALD): from precursors to thin film structures," Thin Solid Films, 2002, 409(1), 138-146.

Lu Y.C., et al., "Electrocatalytic Activity Studies of Select Metal Surfaces and Implications in Li-Air Batteries," Journal of the Electrochemical Society, 2010, 157(9) A1016-A1025.

Lu Y.C., et al., "Method Development to Evaluate the Oxygen Reduction Activity of High-Surface-Area Catalysts for Li-Air Batteries," Electrochemical and Solid-State Letters, 2011, 14(5), A70-A74.

Lu Y.C., et al., "The Influence of Catalysts on Discharge and Charge Voltages of Rechargeable Li-Oxygen Batteries," Electrochemical and Solid-State Letters, 2010, 13(6) A69-A72.

Lu Y.C.; et al., "Platinum-Gold nanoparticles: A Highly Active Bifunctional Electrocatalyst for Rechargeable Lithium-Air Batteries," Journal of the American Chemical Society, 2010, 132(35), 12170-12171.

Lu, J. L. ; Stair, P. C., "Nano/Subnanometer Pd Nanoparticles on Oxide Supports Synthesized by AB-type and Low-Temperature ABC-type Atomic Layer Deposition: Growth and Morphology," Langmuir, 2010, 26(21), 16486-16495.

Lu, J. L.; Stair, P. C., "Low-temperature ABC-type atomic layer deposition: synthesis of highly uniform ultrafine supported metal nanoparticles," Angew. Chem., Int. Ed., 2010, 49(14), 2547-51.

Mccloskey, et al., "Solvents' Critical Role in Nonaqueous Lithium-Oxygen Battery Electrochemistry," J. Phys. Chem. Lett., 2, 1161-1166, (2011).

Ogasawara, et al., "Rechargeable Li2O2 Electrode for Lithium Batteries," J. Am. Chem Soc., 128, 1390-1393, (2006).

Pellin, M. J., et al., "Mesoporous catalytic membranes: Synthetic control of pore size and wall composition," Catalysis Letters, 2005, 102(3-4), 127-130.

Puurunen, R. L., "Surface chemistry of atomic layer deposition: A case study for the trimethylaluminum/water process," J. Appl. Phys., 2005, 97(12), 121301-52.

Ren, X., et al. "Oxygen reduction reaction catalyst on lithium/air battery discharge performance," J. Mater. Chem., 2011, 21, 10118-10125.

Shao, M. H., et al., "Structural dependence of oxygen reduction reaction on palladium nanocrystals," Chem. Comm., 2011, 47, 6566-6568.

Shin , H. J., et al., "Formation of TiO2 and ZrO2 nanotubes using atomic layer deposition with ultraprecise control of the wall thickness," Adv. Mater, 2004, 16(14), 1197-1200.

Thapa, A. K., et al., "Pd / MnO2 Air Electrode Catalyst for Rechargeable Lithium/Air Battery," Electrochem. Solid-State Lett., 2010, 13(11), A165-A167.

Trahey, et al., "Activated Lithium-Metal-Oxides as Catalytic Electrodes for Li-O2 Cells," Electrochemical and Solid-State Letters, 14, (5), A64-A66, (2011).

Wang, Deyu, et al., "High Capacity Pouch-Type Li—Air Batteries," J. Electrochem. Soc., 2010, 157(7), A760-A764.

Wang, Y.; Zhou, H., "To draw an air electrode of a Li—air battery by pencil," Energy Environ. Sci., 2011, 4, 1704-1707.

Williford, Re; Zhang, J., "Air Electrode Design for Sustained High Power Operation of Li/air Batteries," Journal of Power Sources, 2009, 194(2):1164-1170.

Xiao, Jie, et al., "Optimization of Air Electrode for Li/Air Batteries," J. Electrochem. Soc., 2010, 157(4), A487-A492.

Xu et al., "Reaction Mechanisms for the Limited Reversibility of Li-O2 Chemistry in Organic Carbonate Electrolytes", Journal of Power Sources, 2011, 196(22), pp. 9631-9639.

Xu, W., et al., "Effects of Nonaqueous Electrolytes on Primary Li-Air Batteries," J. Electrochem. Soc., 2010, 157.

Yoo, et al., "Li-Air Rechargeable Battery Based on Metal-free Graphene Nanosheet Catalysts," ACS Nano, vol. 5, No. 4, 3020-3026, (2011).

Zhang et al., "Increased Stability Toward Oxygen Reduction Products for Lithium-Air Batteries with Oligoether-Functionalized Silane Electrolytes", The Journal of Physical Chemistry, 2011, 115, pp. 25535-25542.

Zhang, G.Q., et al., "α-MnO2/Buckypaper Composite Catalytic Air Electrodes for Rechargeable Lithium-air Batteries," J. Electrochem. Soc., 2011, 158 A822.

Zhang, Jian, et al., "Air Dehydration Membranes for Nonaqueous Lithium-Air Batteries," J. Electrochem. Soc., 2010, 157(8): A940-A946.

* cited by examiner

US 9,005,816 B2

COATING OF POROUS CARBON FOR USE IN LITHIUM AIR BATTERIES

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

FIELD

The present technology is generally related to materials for use in lithium air batteries. In particular it is related to coated lithium air cathode catalyst materials and methods of coating.

BACKGROUND

Lithium-air (Li-air) batteries are currently the subject of intense scientific investigation due to the extremely high theoretical energy density of 12 kWh/kg, which far exceeds that of any other existing energy storage technology.

In Li-air batteries, the oxygen electrode should be porous. The porosity stores the solid products generated from the reaction of Li ions with $O_2$ (e.g. $Li_2O$ and $Li_2O_2$) during the discharge cycle of the battery, and porous oxygen electrode must integrate a catalyst to promote the reactions. A variety of factors dictate the extent of electrochemical (discharge and charge) reactions in Li-air cells including the nature of the catalyst, the catalyst distribution on the porous cathode, the pore volume of the cathode, as well as the type of the applied organic electrolytes.

Both the surface area and porosity of the cathode are critical for the performance of lithium-air batteries. Larger surface areas provide more catalyst particles and catalytically active sites to accelerate the electrochemical reactions and increase the current density on discharge. Larger pores facilitate faster oxygen diffusion and provide the volume necessary to accommodate the reduction products deposited during discharge.

For practical applications, Li-air batteries must be rechargeable, thereby necessitating using a sufficiently high potential or a catalyst to promote the discharge reactions. However, high overpotentials on charge and discharge, even at very low current densities of 0.01-0.05 mA/cm$^2$, result in very low cycling efficiencies (<60%) and low power capability.

Metals, metal complexes, and metal oxides have all been examined as the cathode catalysts in the Li-air cells, and these catalysts show large differences in discharge capacity and charge plateau. For instance, the charging activity of pure carbon is very poor, showing an average voltage plateau at 4.7 V. This plateau is slightly reduced when a catalyst is introduced to the cathode. For example, the charge plateau was reduced to 4.2 V using a $MnO_x$ catalyst on the carbon support and allowed a charging density of 0.1 mA/cm$^2$. However, it should be pointed out that the charge overpotential is still high (>4.0 V) in most of cases despite different catalysts are applied to the cathode.

Although much of the reported research has been focused on developing metal catalysts and cathode structures, it has recently become apparent that the electrolyte plays a key role in the cell performance. The oxygen anion radical $O_2^-$ intermediate or other reduction species, which may be formed during the discharge process, can be highly reactive and may cause the electrochemical response to be dominated by electrolyte decomposition rather than by the expected lithium peroxide formation. However, it should be recognized that the carbon cathode structure (together with the catalyst) is coupled with the electrolyte in the Li-air battery. For instance, the decomposition of electrolyte may takes place on the carbon surface due to its natural defects on the carbon, which serves as the catalytic site not only for the formation of the desired discharged products ($Li_2O_2$), but also for the decomposition of electrolytes.

We applied Atomic layer deposition (ALD) technique as an example to demonstrate the effect of coating of porous carbon on the efficiency of Li-air battery. Atomic layer deposition (ALD) is a technique for preparing thin films on planar substrates that employs self-limiting chemical reactions between gaseous precursors and a solid surface allowing atomic scale control over the film thickness and composition. One of the distinguishing attributes of ALD is the capability to deposit highly uniform and conformal coatings on surfaces with complex topographies and to infiltrate mesoporous materials. This feature is particularly attractive for the synthesis of heterogeneous catalysts requiring highly dispersed catalytic species on high surface area, mesoporous supports. Consequently, ALD is being explored as an alternative method for preparing advanced catalysts.

The layer-by-layer growth process afforded by ALD typically yields smooth, uniform films and this is ideal for most microelectronics applications. However, non-uniform deposits can occur when the ALD chemistry is inhibited on the starting substrate or when the ALD material aggregates from surface diffusion. Both of these mechanisms are in effect in the early stages of noble metal ALD on oxide surfaces, which result in the formation of discrete, three-dimensional nanoparticles decorating the surface. This behavior has been exploited to synthesize supported noble metal catalysts exhibiting remarkably high activity as a result of the highly dispersed, small noble metal particles. The good dispersion of the active particles on the support during ALD enables a decreasing of the metal loading while still achieving the same catalytic activity as the catalysts with higher metal loading prepared by other methods. This is especially important with noble metal materials where the excess use of the raw materials should be avoided. Uniform palladium nanoparticles in the size range from sub-nanometer to a few nanometers, are one of the most efficient catalysts for facilitating the oxygen reduction reaction (ORR) in the fuel cell, and have been synthesized by ALD on high surface area supports. However, performing ALD on porous carbon surface in general has been a technical challenge because of the lack of active sites on carbon for surface reactions, and therefore, has not been well studied.

SUMMARY

In one aspect, a cathode is provided that includes a carbon material having a surface, the surface including a thin layer that includes an inert material, and the surface includes a catalyst overlaying the thin layer, the catalyst including metal or metal oxide nanoparticles, wherein the cathode is configured for use as the cathode of a lithium-air battery. The inert material may include a metal oxide, a metal halide, a metal oxyfluoride, a metal phosphate, a metal sulfate, a non-metal oxide, or a non-metal. The inert material may include one or more of $Al_2O_3$, $ZrO_2$, ZnO, $AlF_3$, $CaF_2$, $SiO_2$, $GeO_2$, $CeO_2$, $TiO_2$, MgO, Si, Se, $BiF_3$, $MgF_2$, $MnF_3$, $NiF_3$, $CoF_3$, $FeF_3$, $CaF_2$, $Zn_2OF_2$, $FePO_4$, $Ca_3(PO_4)_2$, $CaSO_4$, $BaSO_4$, or a mixture of any two or more inert materials. The catalyst may include a metal nanoparticle including Pd, Ni, Mn, Cu, Co, Fe, Pt, Au, Ag, Ir, Rh, or Ru, or a mixture of any two or more such metals. Illustrative catalysts may include, but are not limited to, PdO, NiO, $Ni_2O_3$, MnO, $Mn_2O_3$, $MnO_2$, CuO, $Cu_2O$, $Co_3O_4$, $Co_2O_3$, FeO, $Fe_3O_4$, or a mixture of any two or more metal oxides. In some embodiments, the catalyst includes a mixture of metal nanoparticles and metal oxide nanoparticles. The carbon material may include one or more of synthetic graphite, natural graphite, amorphous carbon, hard carbon, soft carbon, acetylene black, mesocarbon microbeads (MCMB), carbon black, Ketjen black, mesoporous carbon, porous carbon matrix, carbon nanotube, carbon nanofiber, or graphene. In some embodiments, the thin layer includes two or more layers of the inert material. For example, this includes two or deposition layers of the catalyst. In some embodiments, the cathode may also include a binder and/or a current collector.

In another aspect, a process for preparing a cathode material includes depositing a thin layer including an inert material on the surface of a carbon material by atomic layer deposition, chemical vapor deposition, or sputter coating; and depositing on the thin layer a catalyst including metal nanoparticles, metal oxide nanoparticles, or a mixture thereof by atomic layer deposition, chemical vapor deposition, or sputter coating to form the cathode material; wherein the cathode material is configured for use as a cathode in a lithium-air battery. The process may include depositing the thin layer in multiple cycles. The process of may include depositing the catalyst in multiple cycles. In some embodiments, the process includes mixing the cathode material with a binder. Illustrative binders include, but are not limited to, poly(acrylonitrile), poly(vinylidene fluoride), polyvinyl alcohol, polyethylene, polystyrene, polyethylene oxide, polytetrafluoroethylene, polyimide, styrene butadiene rubber, carboxy methyl cellulose, gelatin, a copolymer of any two or more such polymers, or a blend of any two or more such polymers.

In some embodiments, the process includes providing an inert material precursor configured to decompose or react in the depositing to form the inert material. Illustrative inert material precursors include, but are not limited to, one or more of a trialkylaluminum, trialkylaluminum, trifluoroaluminum, trichloroaluminum, tribromoaluminum, $AlMe_2Cl$, $AlMe_2OPr$, $Al(OEt)_3$, $Al(OPr)_3$, $ZrCl_3$, $ZrCl_4$, $ZrI_4$, $ZrCp_2Cl_2$, $ZrCp_2Me_2$, $Zr(OBu)_4$, $Zr(dmae)_4$, $Zr(thd)_4$, $Zr(NMe_2)_4$, $Zr(NEt_2)_4$, $Zr(OPr)_2(dmae)_2$, $Zr(OBu)_2(dmae)_2$, $Zr(NEtMe)_4$, $ZnCl_2$, $ZnEt_2$, $ZnMe_2$, $Zn(OAc)_2$, $SiCl_4$, $SiCl_3H$, $SiCl_2H_2$, HMDS, $Si(NCO)_4$, $MeOSi(NCO)_3$, $GeCl_4$, $MgCp_2$, $Mg(thd)_2$, $TiCl_4$, $TiI_4$, $Ti(OMe)_4$, $Ti(OEt)_4$, $Ti(OPr)_4$, $Ti(OPr)_2(dmae)_2$, $Ti(OBu)_4$, or $Ti(NMe_2)_4$. In other embodiments, the process may include providing a catalyst precursor. Illustrative catalyst precursors include, but are not limited to, one or more of $PdCl_2$, $Pd(acac)_2$, $HAuCl_4$, $H_2PtCl_4$, $H_2PdCl_4$, $AgNO_3$, palladium bis-hexafluoroacetylacetonate, bis(2,2,6,6,-tretramethyl-3,5-heptanedionato) palladium (Pd (thd)$_2$), $Ru(CpEt)_2$, $RuCp_2$, $Ru(od)_3$, $Ru(thd)_3$, Pt(CpMe)Me$_3$, $Pt(acac)_2$, $Ir(acac)_3$, $FeCl_3$, $Fe(acac)_3$, $Fe(thd)_3$, $FeCp_2$, $Mn(thd)_3$, $Co(acac)_2$, $Co(acac)_3$, $Co(thd)_2$, $NiCp_2$, $Ni(acac)_2$, $Ni(thd)_2$, $Ni(apo)_2$, $Ni(dmg)_2$, $Cu(acac)_2$, $Cu(thd)_2$, or $Cu(hfac)_2$. The process may also include a co-reactant that is an oxygen source material to react with the catalyst precursor. In some embodiments, the co-reactant oxygen source material includes one or more of oxygen, formalin, methanol, ethanol, water, ozone, hydrogen peroxide, mixture of hydrogen and oxygen, glyoxylic acid, ozone, $N_2O$, $NO_2$, or $N_2O_4$.

In another aspect, a lithium-air battery is provided, the battery including a carbon material having a surface, the surface including a thin layer including an inert material and a catalyst overlaying the thin layer, the catalyst including metal or metal oxide nanoparticles; an anode including lithium; and a porous separator disposed between the cathode and the anode. The porous separator may include a porous ceramic, glass fibers, or a porous polymer. In some embodiments, the porous separator includes a polymer that is polyether ether ketone; thermoplastic polyimide; polybenzimidazole; a high-temperature sulfones; a polyamide-imide; a fluoropolymer; a polyethersulfone; a liquid-crystal polymer; a polyetherimide; a nylon; a polyphenylene sulfide; polyethylene terephthalate; polyvinylidene fluoride; polypropylene; or polyethylene.

DETAILED DESCRIPTION

Figure 1:
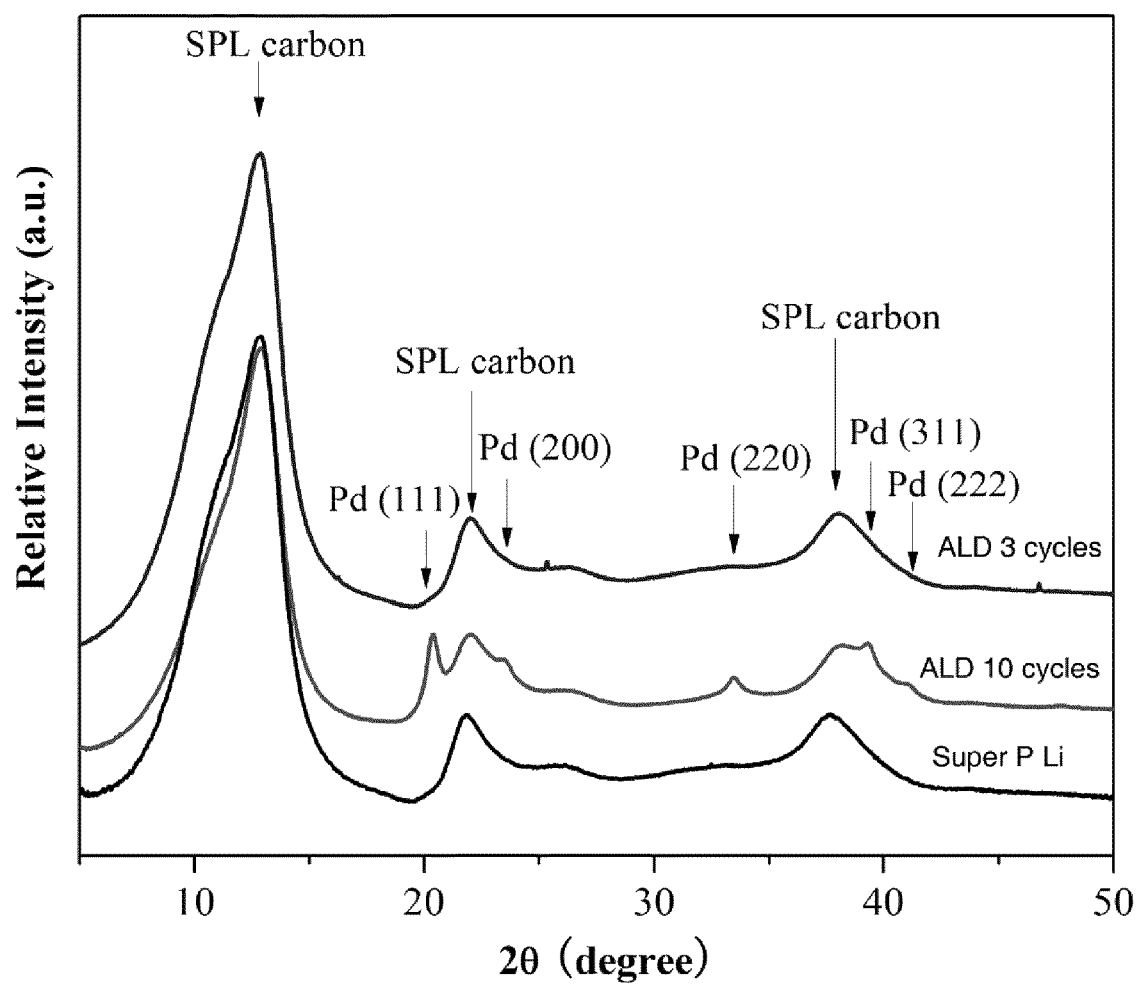
FIG. 1 is a compilation of three high-resolution XRD patterns of original SPL carbon (bottom), SPL carbon after being loaded with Pd catalyst using 3 cycles of Pd ALD (top), and SPL carbon after being loaded with Pd catalyst using 10 cycles of Pd ALD (middle), according to the examples.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Porous carbon electrodes are provided for lithium-air batteries, where the porous carbon electrode has both a protected (inert) surface coating and an active (catalytic) surface coating. The carbon electrodes may have a first surface coating that could be but not limited to an inert oxide layer, and a second surface coating that has a catalytic metal or metal oxide layer. Such coatings together significantly reduce the overpotential of the Li-air battery. Such coatings may be layered to enhance the effects imparted on the battery. For example, as will be further described below, a carbon surface is initially coated with a thin layer of an inert material (first layer). The thin layer of inert material coats and fills in surface defects of the carbon surface. The thin layer may be the result of the deposition of multiple thin layers of the inert material. The catalyst (second layer) includes metal or metal oxide nanoparticles, as electrochemical catalysts for the formation and decomposition of $Li_2O_2$ on the surface of the electrode. As a result of the carbon material having at least the inert layer and the catalyst, the overpotential of the cathode is significantly reduced, and the efficiency of a lithium-air battery incorporating the cathode is increased.

In a first aspect, a cathode is provided, the cathode including a carbon material having a surface. The surface of the carbon material has coated thereon a thin layer of an inert material. The thin layer has an overcoating of metal, or metal oxide nanoparticles as a catalyst. Such cathodes are suitable for use in lithium-air batteries.

The carbon material may be a carbon material as are known for use as cathodes in lithium-air batteries. Illustrative materials include, but are not limited to, synthetic graphite, natural graphite, amorphous carbon, hard carbon, soft carbon, acetylene black, mesocarbon microbeads (MCMB), carbon black, Ketjen black, mesoporous carbon, porous carbon matrix, carbon nanotube, carbon nanofiber, and graphene. Commercial examples of carbon black include, but are not limited to, Super P®, Super P® Li, Black Pearl 2000, Denka Black, Vulcan XC72R, and Ketjen black.

As used herein "inert material" means that the material is stable in an oxygen containing atmosphere. The term is not used in the traditional sense of the term (i.e. that it is inert with respect to any reaction). In other words, reaction of the inert material with oxygen does not proceed, or at least proceeds at a very slow rate, under ambient conditions. "Inert material" also means that the material is stable in an organic electrolyte and in that electrolyte when exposed to an oxygen containing atmosphere. In other words, the electrolyte decomposition reaction on the inert material does not proceed, or at least proceeds at a very slow rate, under ambient conditions. Suitable inert materials include metal oxides, metal halides, metal oxyfluoride, metal phosphate, metal sulfate, non-metal oxides, and non-metal elements. For example, metal oxides may include, but are not limited to, $Al_2O_3$, $ZrO_2$, and ZnO. Illustrative metal halides may include, but are not limited to, $AlF_3$ and $CaF_2$. Illustrative metal oxyfluoride may include, but are not limited to, AlOF and $Zn_2OF_2$. Illustrative metal phosphate include, but are not limited to, $FePO_4$ and $Ca_3(PO_4)_2$. Illustrative metal sulfate include, but are not limited to, $CaSO_4$ and $BaSO_4$. Illustrative non-metal oxides include, but are not limited to, $SiO_2$, $SnO_2$ and $GeO_2$. Illustrative non-metal elements include, but are not limited to, Si, or Se. In some embodiments, the inert material is $Al_2O_3$.

The thin layer, whether the result of a single deposition or multiple depositions of the material, may have a thickness of about 0.1 nm to about 100 nm. In some embodiments, the thin layer may have a thickness of about 0.3 nm to about 10 nm. The thin layer may be continuous, meaning that it completely encapsulates the underlying carbon substrate such that no carbon is exposed to the electrolyte. Alternatively, the thin layer may be discontinuous such that patches or regions of the carbon are in contact with the electrolyte.

As noted above, the catalysts include metal or metal oxide nanoparticles. Suitable metals include, but are not limited to, Pd, Pt, Au, Ag, Ir, Rh, and Ru. Suitable metal oxides include, but are not limited to, PdO, NiO, $Ni_2O_3$, MnO, $Mn_2O_3$, $MnO_2$, CuO, $Cu_2O$, $Co_3O_4$, $Co_2O_3$FeO, and $Fe_3O_4$. The catalyst may be continuous or it may consist of nanoparticles. Mixtures of metal and metal oxide nanoparticles may also be employed in the catalyst. The metal and/or metal oxide may have an average particle size of from about 1 to about 100 nm. In some embodiments, the average particle size is from about 1 nm to about 50 nm. In other embodiments, the average particle size is from about 1 to about 25 nm. In yet other embodiments, the average particle size is from about 1 to about 10 nm. Additionally, a thin layer may be deposited after the catalyst to stabilize the catalyst or modify its catalytic properties.

The carbon material may also include multiple thin layers and multiple catalysts laid in a homogenous (i.e. multiples sequential layers of the same material) or in a alternating fashion. For example, in a homogenous fashion multiple layers of the thin layer are deposited one on the other, and/or multiple layers of the catalyst are deposited one on the other. Alternatively, a catalyst may be deposited on the thin layer, followed by a thin layer on the catalyst, and so on.

The cathodes may also include a binder to hold the porous carbon material together, or maintain contact of the carbon material with a current collector. Illustrative binders include, but are not limited to, poly(acrylonitrile), poly(vinylidene fluoride), polyvinyl alcohol, polyethylene, polystyrene, polyethylene oxide, polytetrafluoroethylene, polyimide, styrene butadiene rubber, carboxy methyl cellulose, gelatin, a copolymer of any two or more such polymers, and a blend of any two or more such polymers.

The coated carbon materials for the cathodes may be prepared by a variety of deposition methods for deposition of the thin layers and the catalysts on the carbon material. For example, techniques such as atomic layer deposition (ALD), sputtering, co-precipitation, chemical vapor deposition (CVD), physical vapor deposition (PVD) or electron beam deposition (EBD) may be used to deposit the thin layers and/or the catalysts.

As used herein, ALD refers to a process where the carbon material is exposed to a precursor vapor (A) that reacts with the carbon surface in a self-limiting fashion to yield a monolayer of chemisorbed precursor molecules. Subsequent exposure of this modified surface to a second precursor vapor (B) results in a second self-limiting chemical reaction to produce a monolayer of a compound material such as $AB_x$, or an elemental material such as A. Repeating the cycle of the first and second precursor vapor exposures (A, B) adds a second monolyer of material onto the carbon, and so on (A, B, A, B . . . ). The precursor vapors are never mixed in the gas phase. Variants of this general process, such as repeating cycles of three precursor vapors (A, B, C . . . ) are well documented in the prior art. ALD on the carbon powder can be performed in a fixed bed system where the carbon is stationary and the precursor vapors diffuse into the pores between the carbon particles to form the coating. Alternatively, the powder can be agitated, such as by tumbling the powder in a drum, or by circulating the powder in a fluidized bed, to improve the contact between the carbon surface and the precursor vapors.

As used herein, sputtering refers to a process where atoms are ejected from a solid target material due to bombardment of the target by energetic particles. Sputter deposition is a method of depositing thin films by sputtering which involves eroding material from a "target" source onto a "substrate."

As used herein, co-precipitation refers to a process where a solute that would normally remain dissolved in a solution precipitates out on a carrier that forces it to bind together, rather than remaining dispersed. In the process of coprecipitation, chemical similarities between a carrier and a solute allow the two to bind in some way. The binding pulls the solute out of the solution as the carrier forms crystals or other structures.

As used herein, CVD refers to a process where the wafer (substrate) is exposed to one or more volatile precursors, which react and/or decompose on the substrate surface to produce the desired deposit.

As used herein, PVD refers to a process where a variety of vacuum deposition methods used to deposit thin films by the condensation of a vaporized form of the desired film material onto various workpiece surfaces. The coating method involves purely physical processes such as high temperature vacuum evaporation with subsequent condensation, or plasma sputter bombardment rather than involving a chemical reaction at the surface to be coated as in chemical vapor deposition.

As used herein, EBD refers to a process where a target anode is bombarded with an electron beam given off by a charged tungsten filament under high vacuum. The electron beam causes atoms from the target to transform into the gaseous phase. These atoms then precipitate into solid form, coating everything in the vacuum chamber (within line of sight) with a thin layer of the anode material.

Accordingly, in another aspect, a process is provided for preparing a cathode material. The process includes depositing a thin layer of an inert material, as defined above, on the surface of a carbon material by ALD, sputtering, co-precipitation, CVD, PVD, or EBD. The process also includes depositing on the thin layer a catalyst including metal or metal oxide nanoparticles, as defined above, by ALD, sputtering, co-precipitation, CVD, PVD, or EBD. In some embodiments, the thin layer and the catalyst are deposited by ALD. The cathode materials prepared by such a process are suitable for use in the cathode of a lithium-air battery.

The process may also include sequential additional of thin layers, one on the other in cycles. Accordingly, the thin layer may be deposited over the course of one cycle, two cycles, three cycles, or more. In one embodiment, the thin layer is deposited by ALD over the course of three cycles of deposition. Similarly, the catalyst may be deposited over the course of multiple deposition cycles. For instance, in some embodiments, the catalyst is deposited over the course of one, two, three, four, five, six, seven, eight, nine, ten, eleven, twelve, or more ALD deposition cycles. In one embodiment, the catalyst is deposited over the course often ALD deposition cycles.

The depositing of the inert layer(s) may include providing an inert material precursor, which upon decomposition or reaction with other precursors used in the deposition results in the deposition of the inert material. For example, illustrative inert material precursors include, but are not limited to, trialkylaluminum, trialkylaluminum, trifluoroaluminum, trichloroaluminum, tribromoaluminum, $AlMe_2Cl$, $AlMe_2OPr$, $Al(OEt)_3$, $Al(OPr)_3$, $ZrCl_3$, $ZrCl_4$, $ZrI_4$, $ZrCp_2Cl_2$, $ZrCp_2Me_2$, $Zr(OBu)_4$, $Zr(dmae)_4$, $Zr(thd)_4$, $Zr(NMe_2)_4$, $Zr(NEt_2)_4$, $Zr(OPr)_2(dmae)_2$, $Zr(OBu)_2(dmae)_2$, $Zr(NEtMe)_4$, $ZnCl_2$, $ZnEt_2$, $ZnMe_2$, $Zn(OAc)_2$, $SiCl_4$, $SiCl_3H$, $SiCl_2H_2$, HMDS, $Si(NCO)_4$, $MeOSi(NCO)_3$, $GeCl_4$, $MgCp_2$, $Mg(thd)_2$, $TiCl_4$, $TiI_4$, $Ti(OMe)_4$, $Ti(OEt)_4$, $Ti(OPr)_4$, $Ti(OPr)_2(dmae)_2$, $Ti(OBu)_4$, or $Ti(NMe_2)_4$. The trialkylaluminum compounds may include $C_1$-$C_4$ trialkylaluminum. In one embodiment, the trialkylaluminum is trimethylaluminum. These metal precursors can be used in combination with O-containing precursors to deposit inert metal oxide thin layers. The metal precursor and O-containing precursor may be supplied simultaneously or in sequential, alternating cycles. For example, illustrative O-containing precursors include, but are not limited to, $H_2O$, $H_2O_2$, $O_2$, $O_3$, O-plasma, $N_2O$, or combinations of these precursors.

As used herein, dmae is an abbreviation for N,N-dimethylaminoethanol, Me an abbreviation for methyl ($-CH_3$), Et is an abbreviation for ethyl ($-CH_2CH_3$), Pr is an abbreviation for n-propyl ($-CH_2CH_2CH_3$), Bu is an abbreviation for n-butyl ($-CH_2CH_2CH_2CH_3$), thd is an abbreviation for 2,2,6,6-tetramethyl-3,5-heptanedione, Cp is an abbreviation for $\eta^5$-cyclopentadienyl, CpMe is an abbreviation for $\eta^5$-methylcyclopentadienyl, CpEt is an abbreviation for $\eta^5$-ethylcyclopentadienyl, Ac is an abbreviation for acetyl ($C(O)CH_3$), acac is an abbreviation for acetylacetonate, cod is an abbreviation for cyclooctadiene, and hfac is an abbreviation for hexafluoracetylacetonate.

The depositing of the catalyst(s) may include providing a catalyst precursor material, with an optional co-reactant. Accordingly, while the catalyst maybe directly deposited, the deposition may include using a precursor material which upon decomposition or reaction during the depositing results in the deposition of the catalyst material. This may include reacting the catalyst precursor with a co-reactant to provide the catalyst material. For example, a metal salt may be used as the catalyst precursor and the co-reactant may be an oxygen containing material that will react with the catalyst precursor. Illustrative catalyst precursors include, but are not limited to, $PdCl_2$, $Pd(acac)_2$, $HAuCl_4$, $H_2PtCl_4$, $H_2PdCl_4$, $AgNO_3$, palladium bis-hexafluoroacetylacetonate, bis(2,2,6,6,-tretramethyl-3,5-heptanedionato) palladium ($Pd(thd)_2$), $Ru(CpEt)_2$, $RuCp_2$, $Ru(cod)_3$, $Ru(thd)_3$, $Pt(CpMe)Me_3$, $Pt(acac)_2$, $Ir(acac)_3$, $FeCl_3$, $Fe(acac)_3$, $Fe(thd)_3$, $FeCp_2$, $Mn(thd)_3$, $Co(acac)_2$, $Co(acac)_3$, $Co(thd)_2$, $NiCp_2$, $Ni(acac)_2$, $Ni(thd)_2$, $Ni(apo)_2$, $Ni(dmg)_2$, $Cu(acac)_2$, $Cu(thd)_2$, or $Cu(hfac)_2$.

The catalyst precursor and co-reactant may be supplied simultaneously or in sequential, alternating cycles. In one embodiment, a catalyst precursor is deposited on the thin layer followed by a co-reactant, followed by additional catalyst precursor, followed by additional co-reactant. Where the catalyst is Pd or $PdO_2$, the catalyst precursor may be a palladium salt such palladium hexafluoroaceteylacetonate, bis(2,2,6,6,-tretramethyl-3,5-heptanedionato) palladium $(Pd(thd)_2)$ or palladium acetylacetonate, and the co-reactant may be formalin, acetone, methanol, glyoxylic acid, water, hydrogen, oxygen, ozone, $N_2O$, $NO_2$, $N_2O_4$, or hydrogen peroxide.

For use in the cathode of a lithium-air battery, the carbon material may be mixed with a binder to provide for electronic communication through the carbon material and to aid in processing the carbon material for use in the cathode. Accordingly, after deposition of the desired thin layers and catalysts, the coated carbon material may be mixed with a binder. Illustrative binders include, but are not limited to, poly(acrylonitrile), poly(vinylidene fluoride), polyvinyl alcohol, polyethylene, polystyrene, polyethylene oxide, polytetrafluoroethylene, polyimide, styrene butadiene rubber, carboxy methyl cellulose, gelatin, a copolymer of any two or more such polymers, and a blend of any two or more such polymers. A solvent may be used in the mixing process to facilitate mixing and blending of the coated carbon material and the binder, followed by solvent removal to cast the coated carbon material and binder mixture as a cathode. The coated carbon material and binder mixture may be cast on a current collector.

In another aspect, a lithium-air battery is provided. The lithium-air batteries incorporate a cathode that include the cathode materials as described above, an anode, and a separator. For example, the cathode may include a carbon material having a surface, the surface having a thin layer of an inert material and a catalyst overlaying the thin layer. The catalyst includes metal or metal oxide nanoparticles. The anode of the battery includes lithium metal.

The separator of the lithium-air battery is a porous separator disposed between the cathode and the anode, to allow for lithium migration through the battery, while preventing or minimizing contact between the cathode and anode. The separators may include a porous ceramic material, glass fibers, or a porous polymer. Illustrative glass fibers include, but are not limited to, soda lime glass. Illustrative porous polymers include, but are not limited to, polyether ether ketone; thermoplastic polyimide; polybenzimidazole; a high-temperature sulfones; a polyamide-imide; a fluoropolymer; a polyethersulfone; a liquid-crystal polymer; a polyetherimide; a nylon; a polyphenylene sulfide; polyethylene terephthalate; polyvinylidene fluoride; polypropylene; or polyethylene. In some embodiments where the separator is a porous polymer, the polymer may include polyethylene, polypropylene, or polyvinylidene fluoride.

The present invention, thus generally described, will be understood more readily by reference to the following examples, which are provided by way of illustration and are not intended to be limiting of the present invention.

EXAMPLES

Example 1

Preparation and Electrochemical Evaluation of ALD $Al_2O_3$—Pd/C Cathodes. Super P® Li conductive carbon black with a typical particle size of 40 nm and a surface area 62 $m^2/g$ was used as the catalyst support material (i.e. a carbon material). ALD was performed in a continuous-flow stainless steel reactor as described by Elam et al. *Rev. Sci. Instrum.* 73, 2981 (2002). About 100 mg of the Super P® Li carbon powder was carefully spread onto a stainless steel tray, and a stainless steel mesh cover was clamped over the tray to contain the powder in a fixed bed while still providing access to the ALD precursor vapors. The carbon powder was held in the reactor at 200° C. under a continuous flow of ultra-high-purity nitrogen carrier gas at 1 Torr pressure for 30 min to outgas and achieved thermal equilibrium. The $Al_2O_3$-ALD used alternating exposures to trimethyl aluminum (TMA, Sigma-Aldrich, 97%) and deionized water at 200° C. Exposure/purge time 60 s-120 s-60 s-180 s was used. Three $Al_2O_3$-ALD cycles on the carbon black powder were performed to cover the carbon defect sites.

After the $Al_2O_3$-ALD cycles, the Pd-ALD was then performed using alternating exposures to palladium hexafluoroacetylacetonate $(Pd(hfac)_2$, Aldrich, 99.9%) and formalin (Sigma-Aldrich, $CH_2(O)$ 37 wt. % in $H_2O$) at 200° C. Timing sequence of a complete ALD cycle can be expressed as $t_1$-$t_2$-$t_3$-$t_4$, corresponding to the precursor exposure time, $N_2$ purge time, co-reactant exposure time and $N_2$ purge time, in seconds, respectively. The timing sequence utilized for the Pd ALD was 100-300-100-300. Catalyst samples were prepared using 1, 3 and 10 cycles Pd ALD cycles on the 3 cycle ALD $Al_2O_3$ coated carbon powder.

Example 2

Electrochemical characterization was carried out using a Swagelok-type cell composed of a lithium metal anode, electrolyte (1M $LiSO_3CF_3$ in tetraethylene glycol dimethyl ether (TEGDME) impregnated into a glass fiber separator), and a porous cathode (13 mm diameter). The cathode was formed by casting a mixture of the as-prepared $Al_2O_3$/Pd/Super P® Li carbon black and binder in a molar ratio of 80:20. The cells were sealed except for the Al grid window that exposed the porous cathode to 1 bar $O_2$ pressure. The electrochemical measurements were carried out using a Biologic MacPile cycler. The discharge-charge performance was conducted in the voltage range of 2.0-4.5 V at a constant current of 100 mA/g, and the cell was maintained in 1 bar $O_2$ atmosphere to avoid any negative effects of humidity and $CO_2$. For comparison, a blank Super P® Li carbon black carbon without any ALD coating and a Super P® Li carbon black coated with $Al_2O_3$ only were also tested using the same cell configuration described above. We normalized the observed capacity by the weight of the carbon and catalyst for comparison in this study.

Example 3

Characterization

The phase structures of the as-prepared Pd nanoparticles were identified using X-ray diffraction (XRD) with a wavelength of 0.774901 Å. The measurements were performed at beamline 11ID-D of Sector 11 at the Advanced Photon Source (APS) of Argonne National Laboratory. The X-ray specimens were prepared by tapping the powder into a Kapton capillary, which was then sealed at both ends. During the course of the measurements, a high-energy X-ray beam hit the sample horizontally, and a 2D detector (Pilatus 2M) was used to collect the X-ray diffraction profiles using transmission mode at a rate of one spectrum per minute. The 2D patterns were then integrated into conventional 1D patterns (intensity vs 2θ), and these data were analyzed using fit2D Software. Based on XRD peak broadening, the crystallite size of the sample was estimated using the Scherrer equation:

$$D_{hkl} = \frac{0.89\lambda}{\beta(2\theta)\cos(\theta)}$$

In the Scherrer equation, β(2θ) is the full width at half-maximum (FWHM) of the pure diffraction peak in radians, λ is the wavelength of the X-rays (0.774901 Å), θ is the diffraction angle, and $D_{hkl}$ is the average diameter of the crystallite in Å.

Pd K-edge (23.564 keV) X-ray absorption spectroscopy (XAS) was performed at the Materials Research Collaborative Access Team (MRCAT) at the Advanced Photon Source, Argonne National Laboratory. The sample was loaded as a self-supporting wafer without binder in the channels (i.d. 4 mm) of a stainless steel multi-sample holder. The sample holder was then placed in the center of a quartz tube, which was equipped with gas and thermocouple ports and Kapton windows. The amount of sample used was optimized to achieve an XAS step height of about 0.5. The XAS spectra were recorded in transmission mode.

The Pd fraction was calculated by conducting Pd X-ray absorption near edge spectroscopy (XANES) linear combination fittings using Athena in the IFEFFIT (version 1.2.11) package. XANES reference spectra were collected using a metallic Pd foil and a Pd oxide sample. Standard procedures based on WINXAS 3.1 software were used to fit the data in the extended X-ray absorption fine structure (EXAFS) regime. The EXAFS coordination parameters were obtained by a least-square fit in q- and r-space of the isolated nearest neighbor, $k^2$-weighted Fourier transform data.

Scanning transmission electron microscopy (STEM, JEOL JEM-2100F FEG FasTEM with an accelerating voltage of 200 KV) was employed to evaluate the morphology and particle size of the ALD Pd catalysts. To prepare the TEM specimens, a dilute suspension was prepared by ultrasonically dispersing the Pd/C catalyst in ethanol for 5 minutes, and a drop of the suspension was placed onto a copper grid and dried. Particle size histograms were generated from the TEM images using software ImageJ.

The phase purity and crystal structure of the prepared ALD Pd/C samples were characterized by high-energy powder XRD, and the results for the 3-cycle and 10-cycle samples are presented in FIG. 1 along with the XRD pattern for the original Super P® Li carbon black for comparison. With the exception of the Super P® Li carbon black carbon peaks, all the peaks for the 10-cycle ALD Pd/C sample in FIG. 1 can be readily indexed to a pure fcc structure with the lattice constant α=3.89 Å, in good agreement with the reported value for Pd found in the inorganic crystal structure database (ICSD). The average grain size for the 10-cycle ALD Pd/C sample estimated by the Scherrer equation to be about 7 nm, which is further confirmed by the TEM analysis described below. Pd in the three cycle ALD Pd/C samples can be readily detected using TEM and EXAFS, as demonstrated below.

Figure 2:
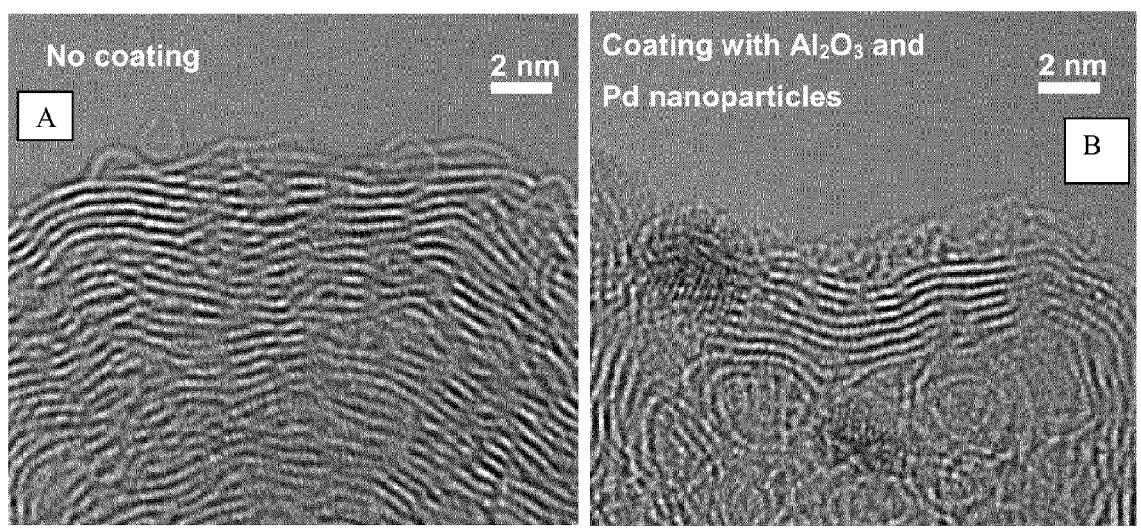
FIGS. 2A and 2B are high resolution TEM images of uncoated carbon (2A, left) and carbon coated with three cycles each of $Al_2O_3$-ALD and Pd-ALD (2B, right), according to the examples.
Figure 3:
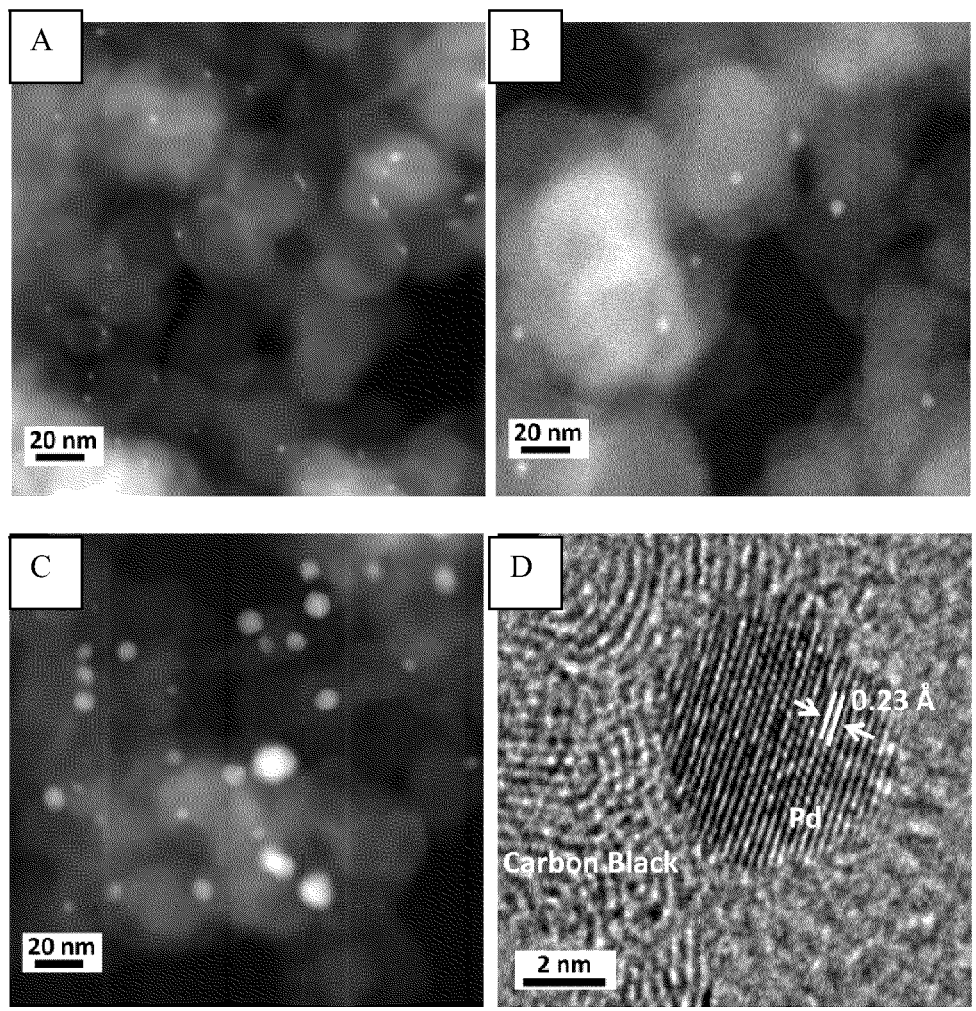
FIGS. 3A, 3B, 3C, and 3D are STEM images of (3A) 1 cycle of Pd/C, (3B) 3 cycles of Pd/C, (3C) 10 cycles of Pd/C, and (3D) HRTEM of a Pd nanoparticles from 10 cycle Pd/C sample prepared by ALD supported over carbon, according to the examples.
FIG. 3E is a graph of Pd particle size as a function of ALD cycles, according to the examples.
Figure 3E:
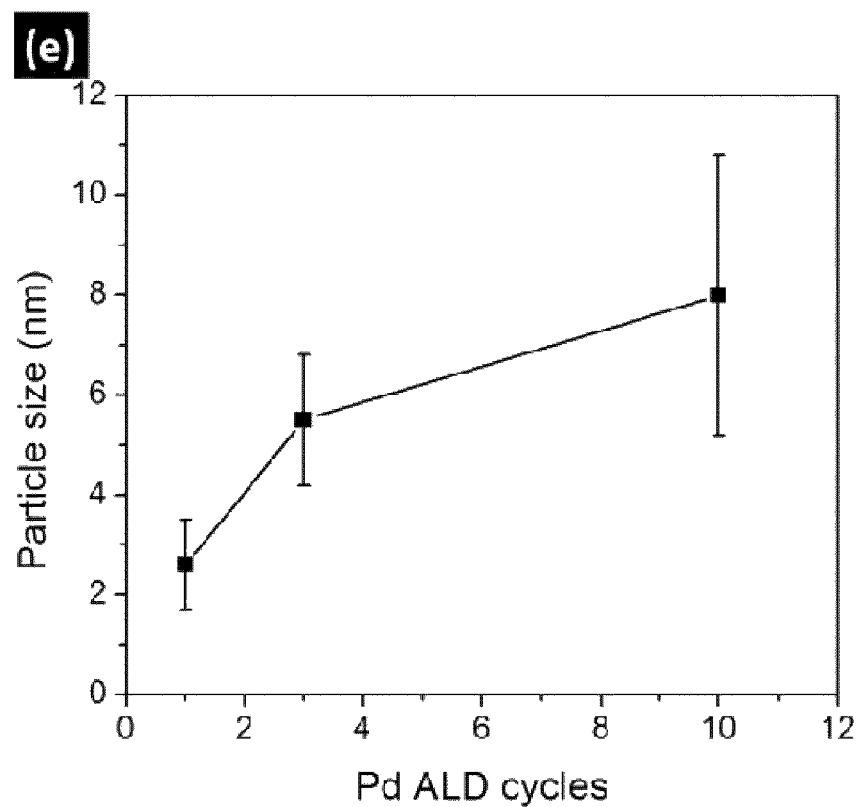

Representative high resolution TEM images of the uncoated carbon and ALD $Al_2O_3$ and ALD Pd coated carbon are illustrated in FIG. 2. The images clearly show that the carbon surface is covered by an $Al_2O_3$ layer using ALD techniques. The Pd nanoparticles are embedded on the $Al_2O_3$ coated surface. Representative STEM images of the 1-cycle, 3-cycle and 10-cycle ALD-Pd/C samples are illustrated in FIGS. 3A, 3B, and 3C, respectively. Well-dispersed and uniform Pd nanoparticles were prepared over the Super P® Li carbon black after 1 cycle and 3 cycles Pd-ALD. However, the 10-cycle sample shows agglomerated Pd nanoparticles. The average size of Pd nanoparticles was determined from multiple images recorded for each sample to be 2.6 nm, 5.5 nm and 8 nm following 1, 3, and 10 Pd-ALD cycles, respectively, as shown in FIG. 3E. FIG. 3D shows a high-resolution transmission electron microscopy (TEM) image for an approximately 5.5 nm Pd/C sample, where lattice fringes for the metal nanoparticles are clearly visible. The nanoparticles show lattice fringes of approximately 0.23 nm, which is consistent with the d-spacing for Pd [111] plane. These TEM images provide direct evidence that the metal nanoparticles are well crystalline and faceted.

Figure 4:
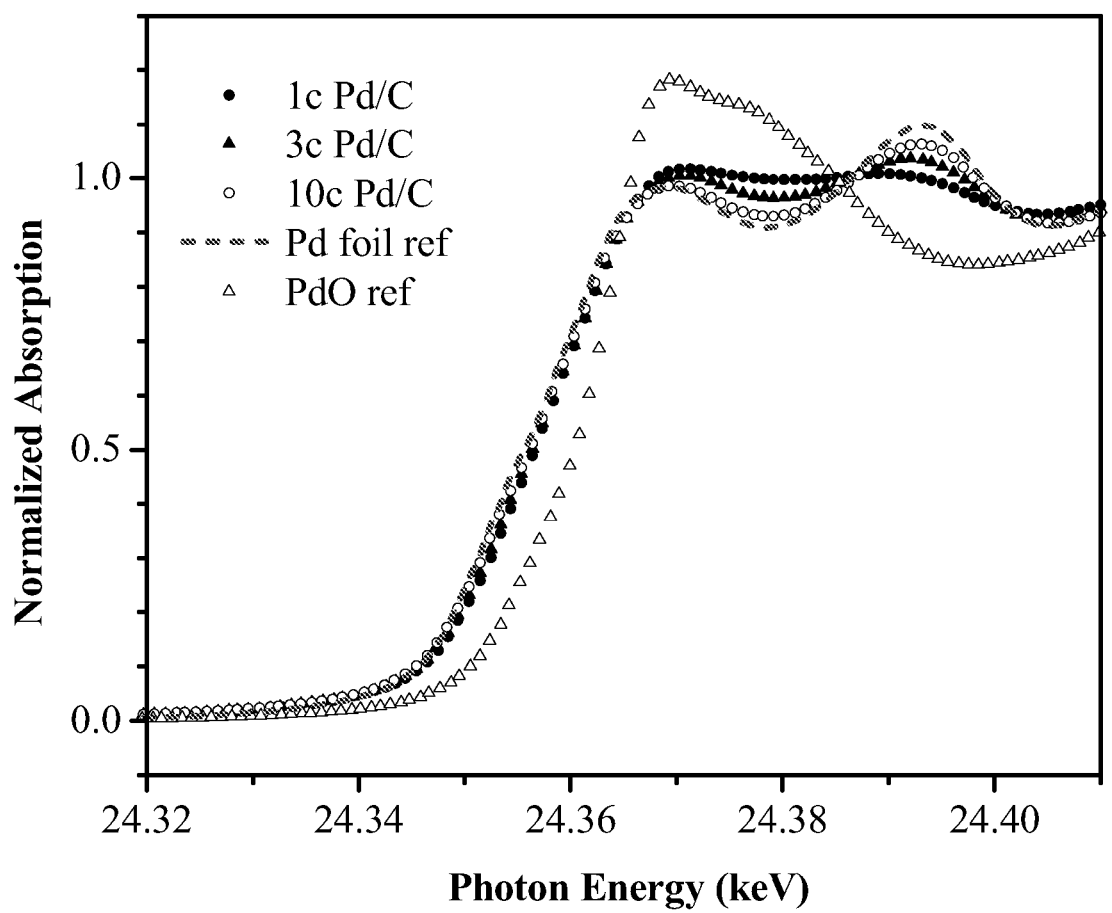
FIG. 4 is a series of XANES spectra for 1 cycle Pd (black solid line), 3 cycle Pd (red solid line), and 10 cycle Pd (blue solid line), and a XANES reference spectra for metallic Pd foil reference (olive dash line) and Pd oxide reference (magenta dash line), according to the examples.

The chemical composition of the Pd nanoparticles was determined using linear combination fitting of XANES spectra recorded in air at room temperature. To facilitate these measurements, XANES reference spectra were recorded for a Pd foil (olive dash line) and a PdO standard (magenta dash line) as shown in FIG. 4. The XANES spectra of 1 cycle, 3 cycles and 10 cycles Pd/C were compared in FIG. 4. With increasing ALD cycles, Pd step edges show a slight shift to lower energy and decreasing whiteline intensity. In comparison to XANES reference of Pd foil and PdO, this indicates an increase in the percentage of metallic component for Pd nanoparticles.

Figure 5:
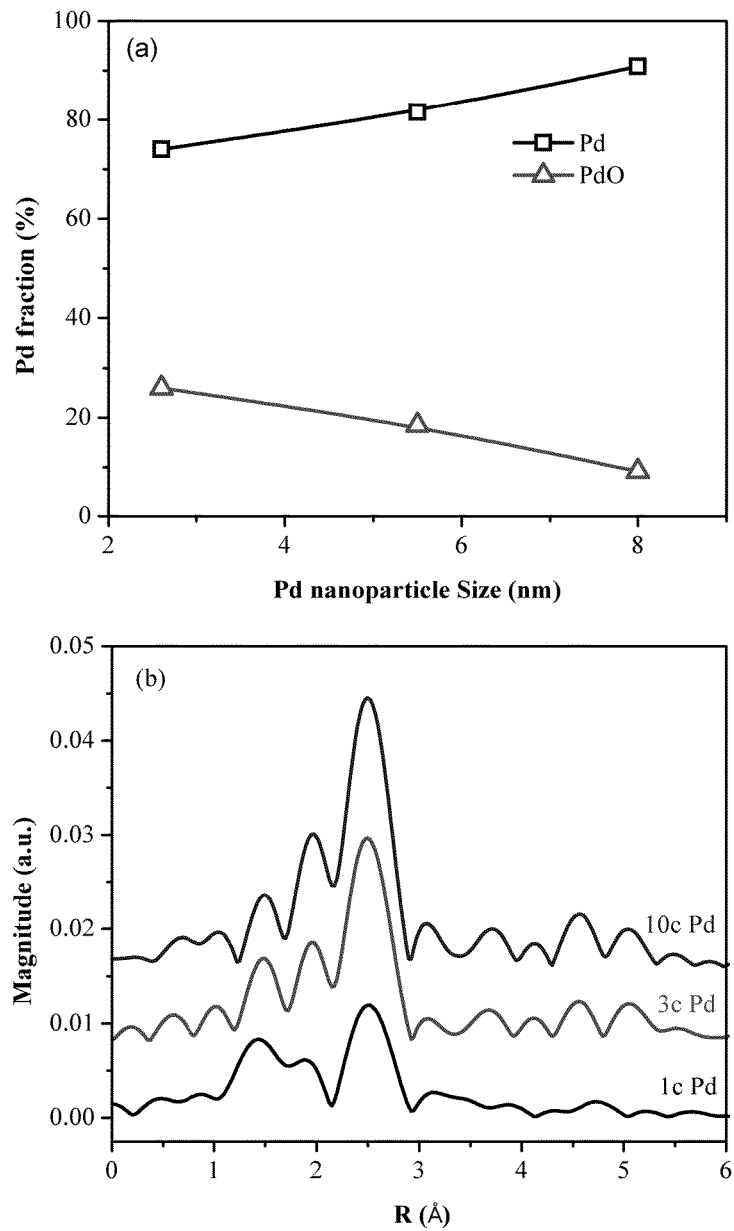
FIG. 5A is XANES Pd oxide fraction of Pd/C samples, obtained using XANES linear combination.
FIG. 5B is a Fourier transform of X-ray absorption spectra ($k^2$: $\Delta k$=2.8-11 $Å^{-1}$), according to the examples.

The quantitative results obtained from linear combination fittings are illustrated in FIG. 5A. The 1-cycle Pd/C with the smallest Pd particle size of about 2.5 nm consists of approximately 26% PdO oxide, and this is highest PdO content of the three samples. With increasing particle size, the PdO content decreases linearly to a value of about 9% for the 8 nm particles. The fraction of surface atoms in these Pd nano-particles, given by 0.9/size (nm), is 0.36, 0.16 and 0.11 for 2.5, 5.5 and 8 nm Pd and very similar to the fraction of PdO determined from the XANES suggesting that primarily the surface of the Pd particles are oxidized.

FIG. 5B is the Fourier transforms of the X-ray absorption spectra. The peaks at about 2 Å and 2.5 Å are finger-print peaks in the first shell for metallic Pd. The Fourier transform measurements for the ALD Pd samples all show similar features in the first shell but the peak intensities increase with increasing ALD cycles, i.e., particle size, determined by STEM. In comparison to the Pd foil spectrum, the as-prepared 1-cycle Pd/C-ALD measured in air is clearly partially oxidized, showing an additional peak at around 1.4 Å that is typically associated with the Pd—O bond. The EXAFS data were fit and the results of this quantitative analysis are listed in Table 1.

TABLE 1

Structural Parameters of Different Pd Samples Measured under Ambient Conditions

| Sample | татем Size, nm | Scatter | $CN^a$ | $R^b$, Å | $DWF^c$ (×10³) | $E_o$, eV |
|---|---|---|---|---|---|---|
| 1 cycle Pd/C | 2.6 | Pd—Pd | 5.3 | 2.74 | 3 | 0.8 |
|  |  | Pd—O | 1.3 | 2.05 | 1 | 3.1 |
| 3 cycles Pd/C | 5.5 | Pd—Pd | 8.2 | 2.75 | 2 | 0.6 |
|  |  | Pd—O | 0.7 | 2.05 | 1 | 2.0 |
| 10 cycles Pd/C | 8 | Pd—Pd | 9.2 | 2.74 | 1 | 1.4 |
|  |  | Pd—O | 0.4 | 2.05 | 1 | 3.8 |

[a] coordination number;
[b] radius of the scattering particle;
[c] Debye-Waller Factor.

The nearest Pd—Pd bond distances are in good agreement with XRD data (2.76 Å). As expected, the Pd—Pd coordination number increases with increasing particle size. The coordination number of nearest Pd—O neighbors in the Pd oxide reference is 4. Thus, the percentage of PdO in the Pd/C-ALD samples can also be calculated as $CN_{Pd-O}/4$. The fractions of PdO calculated from the EXAFS measurements are 32.5%, 17.5%, and 10% for the 1c, 3c, and 10c Pd/C-ALD samples, respectively, which are within the error of the results obtained from the XANES linear combination fittings. Similar to the XANES analysis, the fraction of the oxidized Pd determined from the EXAFS fits are very similar to the fraction of surface Pd in these metallic nano-particles.

On the basis of the results above, but without being bound by theory, it is determined that 1) the carbon surface is covered by an inert $Al_2O_3$ layer; 2) the as-prepared Pd on the $Al_2O_3$-coated carbon surface is surface oxidized and has a crystalline fcc structure, and the average particle size is controlled by the number of Pd-ALD cycles to be in the range of 2-8 nm, and 3) the as-prepared Pd nanoparticles are uniformly distributed on the porous carbon surface. The as-prepared Pd—$Al_2O_3$—C composites with surface-protected porous structures and high specific surface area provide more active sites to absorb $O_2$ molecules. This enhances the catalytic activity for the oxygen reduction reactions (ORR) and the oxygen evolution reactions (OER), in lithium-air battery cells.

Figure 6:
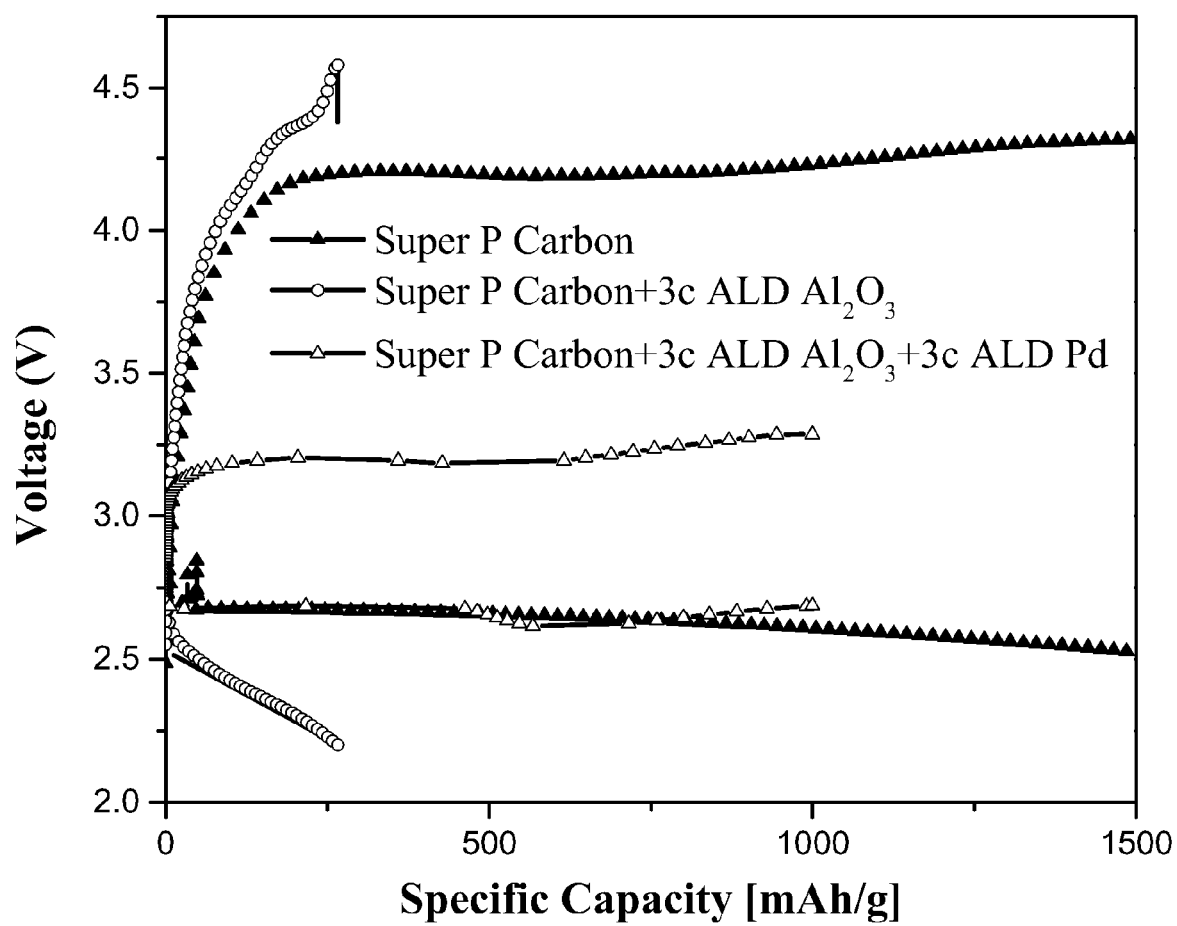
FIG. 6 is a voltage profile during the first discharge-charge of cells based on (red) super P carbon; (green) super P carbon coated with $Al_2O_3$; and (blue) super P carbon further coated with Pd nanoparticles, according to the examples. The electrolyte used in this particular case is TEGDME-LiCF$_3$SO$_3$.
Figure 7:
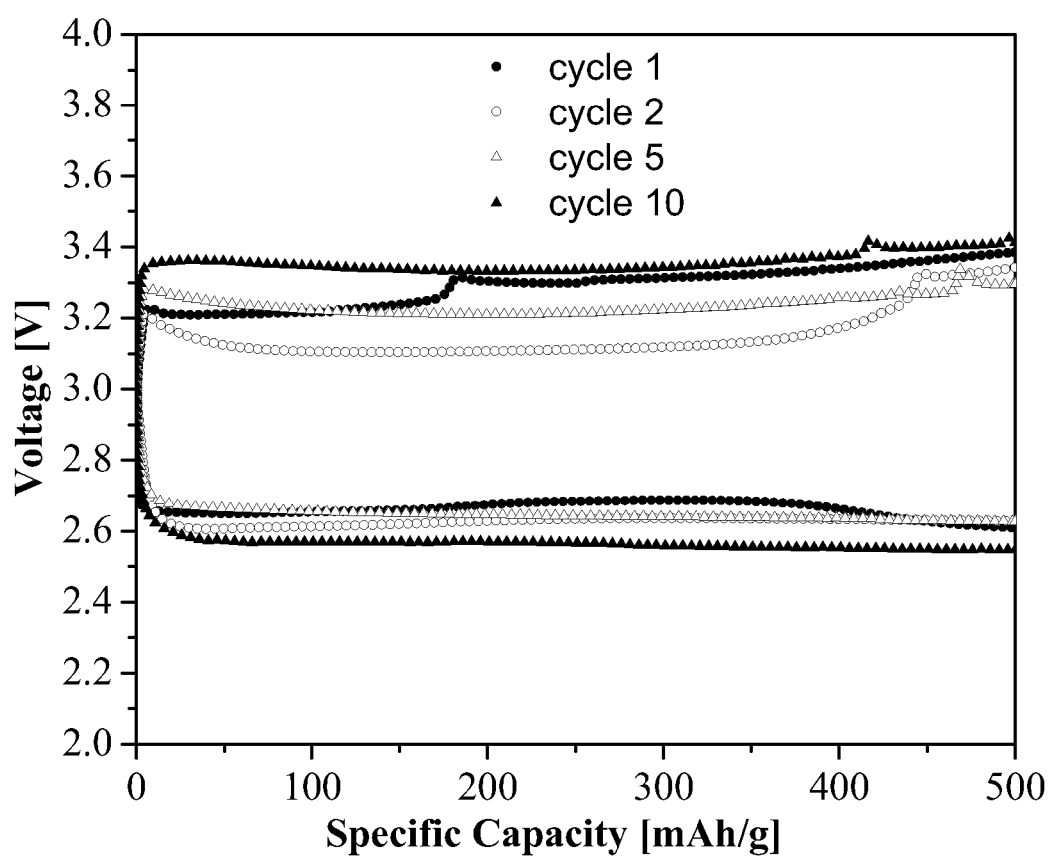
FIG. 7 is a voltage profile during discharge-charge of cells based on super P carbon coated with $Al_2O_3$ and Pd nanoparticles, according to the examples. The electrolyte used in this particular case TEGDME-LiCF$_3$SO$_3$.

The variation of potentials for a Swagelok-type cell consisting of a Li-foil anode and an as-prepared ALD Pd—$Al_2O_3$—C composites cathode during discharge/charge cycling under 1 bar $O_2$ atmosphere was investigated using a MACCOR cycler. The 3-cycle ALD Pd—$Al_2O_3$—C sample was tested as an example. FIG. 6 illustrates voltage profiles recorded during the first discharge/charge cycle obtained when a cell was subject to an initial discharge. For comparison, the cathodes containing Super P® carbon only and ALD 3 cycle-$Al_2O_3$ carbon were also tested, and the results are shown in FIG. 6. It is clearly shown that, surprisingly, the overpotential for the charging is significantly reduced from a charge potential of approximately 4.2 V for just a coating of $Al_2O_3$ to approximately 3.2 V (theoretical 3.1 V) for a layered $Al_2O_3$ and Pd coatings on the carbon surface. This low charge potential can be maintained for over 10 cycles, as shown in FIG. 7.

Figure 8:
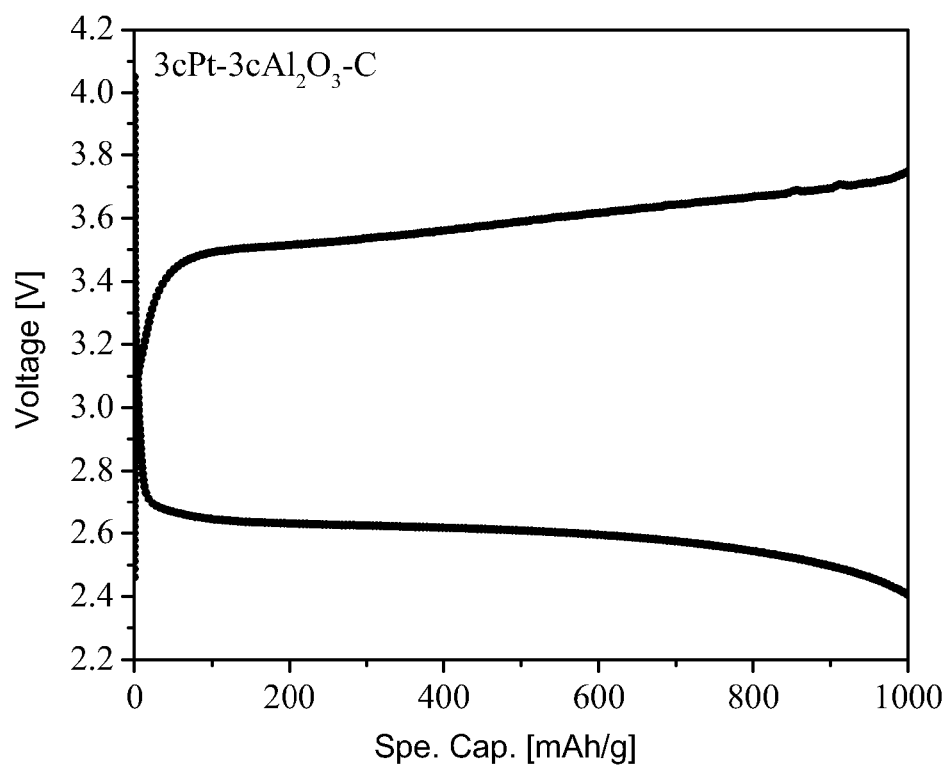
FIG. 8 is a voltage profile during discharge-charge of cells based on super P carbon coated with $Al_2O_3$ and further coated with Pt nanoparticles, according to the examples.
Figure 9:
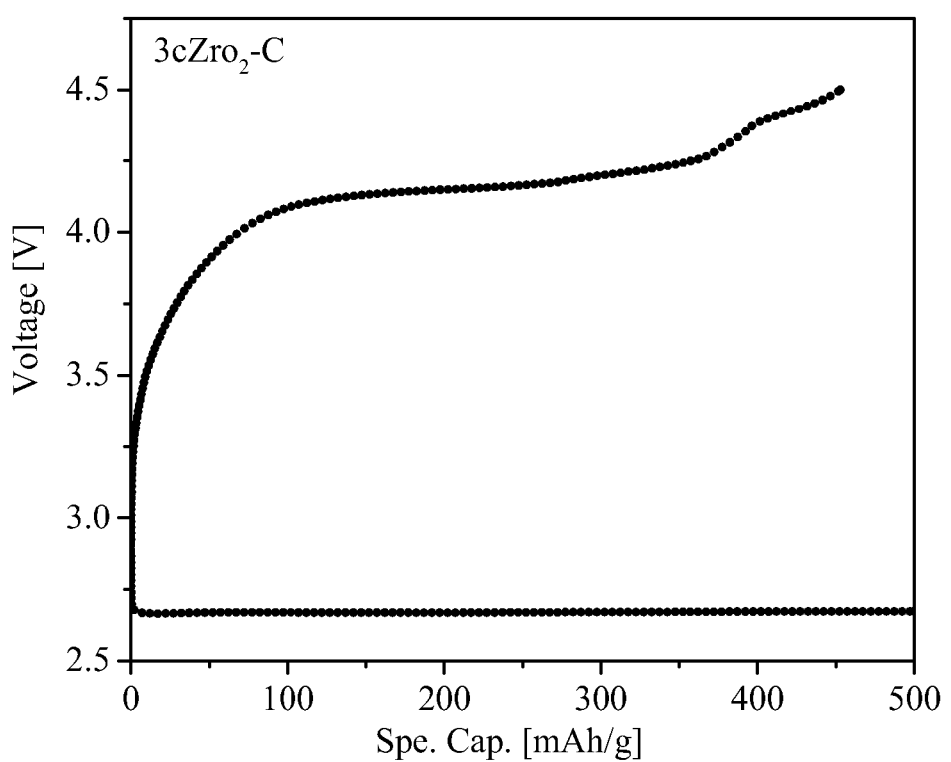
FIG. 9 is a voltage profile during discharge-charge of cells based on super P carbon coated with $ZrO_2$, according to the examples.
Figure 10:
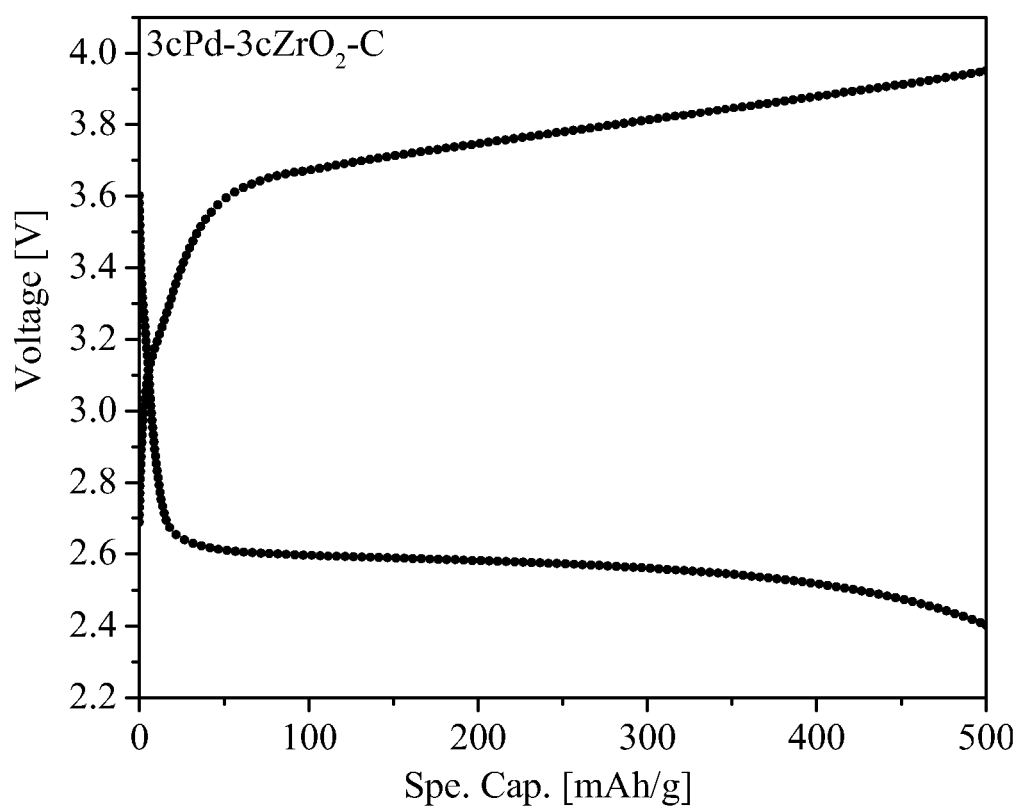
FIG. 10 is a voltage profile during discharge-charge of cells based on super P carbon coated with $ZrO_2$ and further coated with Pd nanoparticles, according to the examples.

Pt nanoparticles were also tested on $Al_2O_3$ coated carbon, and the results are shown in FIG. 8. By applying Pt nanoparticles on the coated carbon, low charge potential can also be achieved. $ZrO_2$ is used to replace the $Al_2O_3$ to protect the carbon surface, and the results also indicated that $ZrO_2$ is a good candidate to protect the carbon surface (See FIGS. 9 and 10.)

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A cathode comprising:
   a carbon material having a surface comprising:
     a thin layer comprising an inert material; and
     a catalyst comprising metal nanoparticles, metal oxide nanoparticles, or a mixture thereof overlaying the thin layer;
   wherein: the cathode is configured for use as the cathode of a lithium-air battery and the inert material is selected from the group consisting of a metal oxide, a metal halide, a metal oxyfluoride, a metal phosphate, a metal sulfate, and a non-metal oxide.

2. The cathode of claim 1, wherein the inert material comprises $Al_2O_3$, aluminum oxyfluoride, $Zn_2OF_2$, $ZrO_2$, ZnO, $AlF_3$, $CaF_2$, $SiO_2$, $GeO_2$, $CeO_2$, $TiO_2$, MgO, Si, Se, $Al_2O_3$, $ZrO_2$, ZnO, MgO, $CeO_2$, $TiO_2$, $AlF_3$ $BiF_3$, $MgF_2$, $MnF_3$, $NiF_3$, $CoF_3$, $FeF_3$, $CaF_2$, $GeO_2$, $FePO_4$, $Ca_3(PO_4)_2$, $CaSO_4$, $BaSO_4$, or a mixture of any two or more thereof.

3. The cathode of claim 1, wherein the catalyst comprises metal nanoparticles comprising Pd, Ni, Mn, Cu, Co, Fe, Pt, Au, Ag, Ir, Rh, or Ru.

4. The cathode of claim 1, wherein the catalyst comprises metal oxide nanoparticles comprising PdO, NiO, $Ni_2O_3$, MnO, $Mn_2O_3$, $MnO_2$, CuO, $Cu_2O$, $Co_3O_4$, $Co_2O_3$, FeO, or $Fe_3O_4$.

5. The cathode of claim 1, wherein the catalyst comprises a mixture of metal nanoparticles and metal oxide nanoparticles.

6. The cathode of claim 1, wherein the carbon material comprises synthetic graphite, natural graphite, amorphous carbon, hard carbon, soft carbon, acetylene black, mesocarbon microbeads (MCMB), carbon black, Ketjen black, mesoporous carbon, porous carbon matrix, carbon nanotube, carbon nanofiber, or graphene.

7. The cathode of claim 1, wherein the thin layer comprises two or more layers of the inert material.

8. The cathode of claim 1, wherein the catalyst comprises two or depositions of the catalyst.

9. A process for preparing a cathode material comprising:
depositing a thin layer comprising an inert material on the surface of a carbon material by atomic layer deposition, chemical vapor deposition, or sputter coating; and
depositing on the thin layer a catalyst comprising metal or metal oxide nanoparticles by atomic layer deposition, chemical vapor deposition, or sputter coating to form the cathode material;
wherein the cathode material is configured for use as a cathode in a lithium-air battery, and the inert material is selected from the group consisting of a metal oxide, a metal halide, a metal oxyfluoride, a metal phosphate, a metal sulfate, and a non-metal oxide.

10. The process of claim 9, wherein the depositing of the thin layer comprises depositing the thin layer in multiple cycles.

11. The process of claim 9, wherein the depositing the catalyst comprises depositing the catalyst in multiple cycles.

12. The process of claim 9 further comprising mixing the cathode material with a binder.

13. The process of claim 9, wherein depositing of the thin layer is by atomic layer deposition and the depositing of the catalyst is by atomic layer deposition.

14. The process of claim 9, wherein the depositing of the thin layer comprises providing an inert material precursor configured to decompose or react in the depositing to form the inert material.

15. The process of claim 14, the inert material precursor is a trialkylaluminum, trialkylaluminum, trifluoroaluminum, trichloroaluminum, tribromoaluminum, $AlMe_2Cl$, $AlMe_2OPr$, $Al(OEt)_3$, $Al(OPr)_3$, $ZrCl_3$, $ZrCl_4$, $ZrI_4$, $ZrCp_2Cl_2$, $ZrCp_2Me_2$, $Zr(OBu)_4$, $Zr(dmae)_4$, $Zr(thd)_4$, $Zr(NMe_2)_4$, $Zr(NEt_2)_4$, $Zr(OPr)_2(dmae)_2$, $Zr(OBu)_2(dmae)_2$, $Zr(NEtMe)_4$, $ZnCl_2$, $ZnEt_2$, $ZnMe_2$, $Zn(OAc)_2$, $SiCl_4$, $SiCl_3H$, $SiCl_2H_2$, HMDS, $Si(NCO)_4$, $MeOSi(NCO)_3$, $GeCl_4$, $MgCp_2$, $Mg(thd)_2$, $TiCl_4$, $TiI_4$, $Ti(OMe)_4$, $Ti(OEt)_4$, $Ti(OPr)_4$, $Ti(OPr)_2(dmae)_2$, $Ti(OBu)_4$, or $Ti(NMe_2)_4$.

16. The process of claim 9, wherein the depositing of the catalyst comprises providing a catalyst precursor comprising $PdCl_2$, $Pd(acac)_2$, $HAuCl_4$, $H_2PtCl_4$, $H_2PdCl_4$, $AgNO_3$, palladium bis-hexafluoroacetylacetonate, bis(2,2,6,6,-tretramethyl-3,5-heptanedionato) palladium ($Pd(thd)_2$), $Ru(CpEt)_2$, $RuCp_2$, $Ru(od)_3$, $Ru(thd)_3$, $Pt(CpMe)Me_3$, $Pt(acac)_2$, $Ir(acac)_3$, $FeCl_3$, $Fe(acac)_3$, $Fe(thd)_3$, $FeCp_2$, $Mn(thd)_3$, $Co(acac)_2$, $Co(acac)_3$, $Co(thd)_2$, $NiCp_2$, $Ni(acac)_2$, $Ni(thd)_2$, $Ni(apo)_2$, $Ni(dmg)_2$, $Cu(acac)_2$, $Cu(thd)_2$, or $Cu(hfac)_2$.

17. The process of claim 14 further comprising a co-reactant oxygen source material to react with the inert material precursor.

18. The process of claim 17, wherein the co-reactant oxygen source material comprises oxygen, formalin, methanol, ethanol, water, ozone, hydrogen peroxide, mixture of hydrogen and oxygen, glyoxylic acid, ozone, $N_2O$, $NO_2$, or $N_2O_4$.

19. A lithium-air battery comprising:
a cathode comprising a carbon material having a surface, the surface comprising a thin layer comprising an inert material and a catalyst overlaying the thin layer, the catalyst comprising metal or metal oxide nanoparticles wherein the inert material is selected from the group consisting of a metal oxide, a metal halide, a metal oxyfluoride, a metal phosphate, a metal sulfate, and a non-metal oxide;
an anode comprising lithium; and
a porous separator disposed between the cathode and the anode.

20. The cathode of claim 1, wherein the inert material comprises $Al_2O_3$, aluminum oxyfluoride, $Zn_2OF_2$, $ZrO_2$, ZnO, $AlF_3$, $CaF_2$, $GeO_2$, $CeO_2$, $TiO_2$, MgO, Se, $Al_2O_3$, $ZrO_2$, ZnO, MgO, $CeO_2$, $TiO_2$, $AlF_3$ $BiF_3$, $MgF_2$, $MnF_3$, $NiF_3$, $CoF_3$, $FeF_3$, $CaF_2$, $GeO_2$, $FePO_4$, $Ca_3(PO_4)_2$, $CaSO_4$, $BaSO_4$, or a mixture of any two or more thereof.

* * * * *